United States Patent [19]

Lake, Jr. et al.

[11] Patent Number: 4,683,465
[45] Date of Patent: Jul. 28, 1987

[54] DATA DISPLAY TERMINAL USING A FLAT DISPLAY PANEL

[75] Inventors: Ralph J. Lake, Jr., Somerville, N.J.; Timothy R. Stern, Southfield, Mich.; George A. Sudol, Mine Hill; Vladimir Selepouchin, Cedar Grove, both of N.J.

[73] Assignee: Burroughs Corporation, Detroit, Mich.

[21] Appl. No.: 683,579

[22] Filed: Dec. 19, 1984

[51] Int. Cl.⁴ .............................................. G09G 3/00
[52] U.S. Cl. .................................... 340/700; 340/720; 358/249
[58] Field of Search ............... 340/700, 718, 719, 720; 248/346, 278, 183; 358/248, 249

[56] References Cited

U.S. PATENT DOCUMENTS

| | | | |
|---|---|---|---|
| 2,954,957 | 10/1960 | Johnson et al. | 248/597 X |
| 3,593,952 | 7/1971 | Smith | 403/146 X |
| 3,845,928 | 11/1974 | Barrett et al. | 403/111 X |
| 4,310,136 | 1/1982 | Mooney | 248/183 X |
| 4,395,010 | 7/1983 | Helgeland | 248/183 X |
| 4,437,638 | 3/1984 | Scheibenpflug | 248/282 |
| 4,438,458 | 3/1984 | Münscher | 340/700 X |
| 4,459,640 | 7/1984 | Lataskewicz et al. | 340/719 X |
| 4,527,766 | 7/1985 | Krenz | 248/11 |
| 4,542,903 | 9/1985 | Yokio et al. | 340/718 X |
| 4,571,456 | 2/1986 | Pawlsen et al. | 340/700 X |

FOREIGN PATENT DOCUMENTS 0160226  9/1984  Japan ................................. 340/718

OTHER PUBLICATIONS

Remote Display for Point-of-Sale Terminal, IBM Technical Disclosure Bulletin, vol. 20, No. 2, 7/77, J. L. Neubance and J. E. Savage.

Primary Examiner—Gerald L. Brigance
Attorney, Agent, or Firm—Mark T. Starr

[57] ABSTRACT

A data display terminal comprises a flat display panel assembly pivotably secured to a base by means of a friction sleeve and a torsion spring so that the display panel assembly can be pivoted with respect to said base and can be held at any selected angular position.

16 Claims, 7 Drawing Figures

DATA DISPLAY TERMINAL USING A FLAT DISPLAY PANEL

CROSS-REFERENCE TO RELATED APPLICATIONS

Reference is made to a copending application entitled "Stable Tiltable Display Terminal", Ser. No. 683,578, filed concurrently with the present application by Ralph J. Lake, Jr., et al., and assigned to the same assignee as the present application.

Reference is also made to a copending application entitled "Display Terminal", Ser. No. 683,683, filed concurrently with the present application by Timothy R. Stern, et al., and assigned to the same assignee as the present application.

BACKGROUND OF THE INVENTION

Data display terminals have been in use for many years, and, up to recent times, these terminals have used cathode ray tubes for their displays. Cathode ray tubes are bulky, and there has been a need for a data display terminal which utilizes a flat display panel in place of the cathode ray tube. The present invention provides such a data display terminal.

DESCRIPTION OF THE INVENTION

Figure 1:
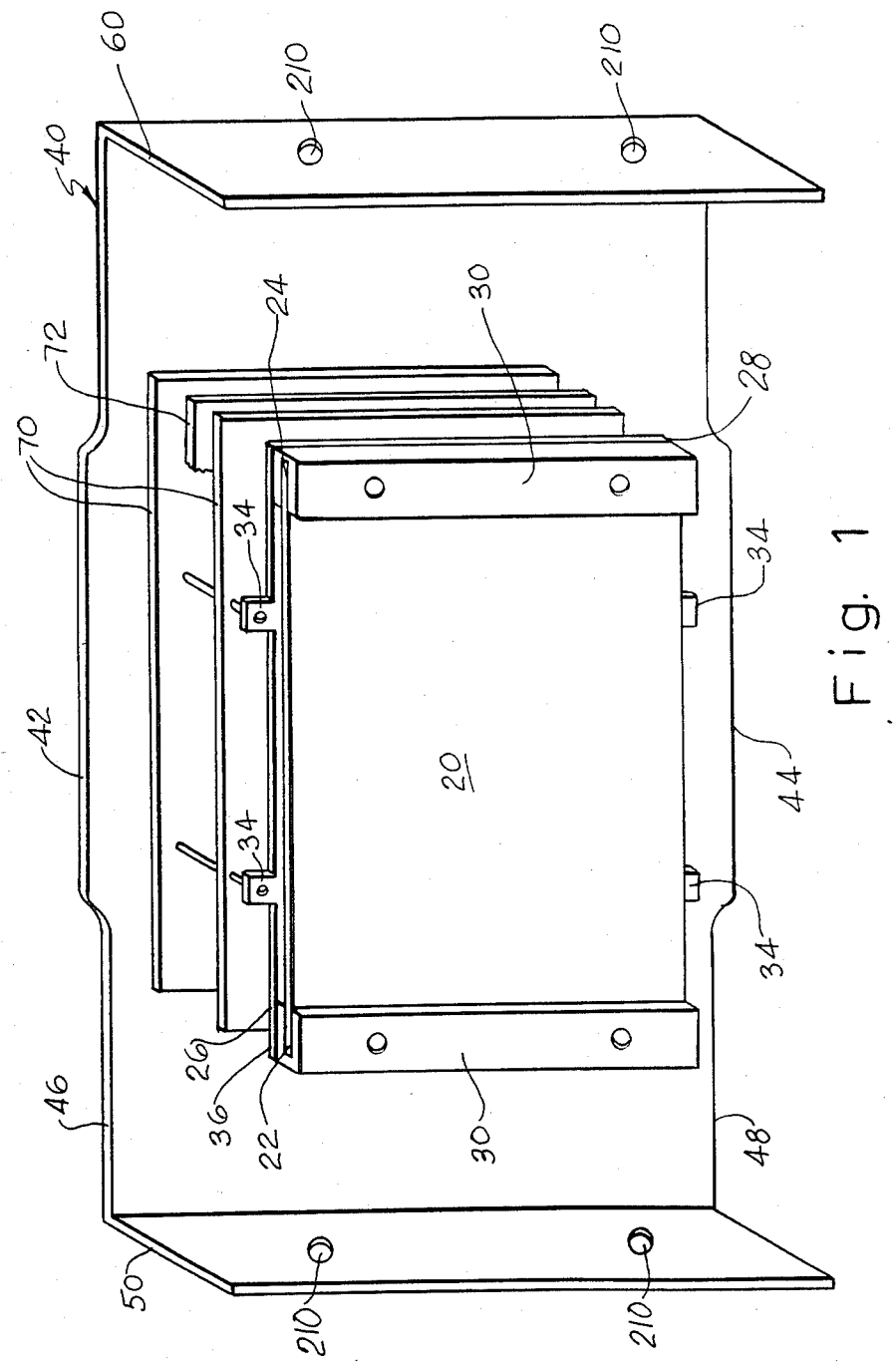
FIG. 1 is a perspective view of the display panel assembly used in the terminal of the invention.

The data display terminal of the invention includes, as its display device, referring to FIG. 1, a flat panel 20 mounted in an assembly which permits it to be supported in the terminal assembly of the invention, to be described. In one suitable panel assembly, the panel, which is generally rectangular in shape, has left and right ends 22 and 24, respectively. A plastic cap 30 is secured to each end of the panel, and four apertured mounting brackets 34 are provided as part of a metal plate 36, to which the panel is secured. The brackets 34 are at the upper and lower edges 26 and 28 of the panel.

The panel 20 with caps 30 is secured to a metal frame 40 by means of screws inserted in the apertures in brackets 34. Metal frame 40 includes a flat central portion having an opening in which the panel is seated. The metal frame includes upper and lower tabs 42 and 44 which are extensions of the upper and lower edges 46 and 48 of the frame and extend along a portion of each of the upper and lower edges. The metal frame 40 also includes left and right end walls 50 and 60 which are bent perpendicularly to the flat central portion.

One or more circuit boards 70 carrying circuitry for driving the panel 20 are positioned behind the panel and are secured to the end caps 30 by means of screws. A magnetic shield plate 72 is positioned between the circuit boards 70.

Figure 2:
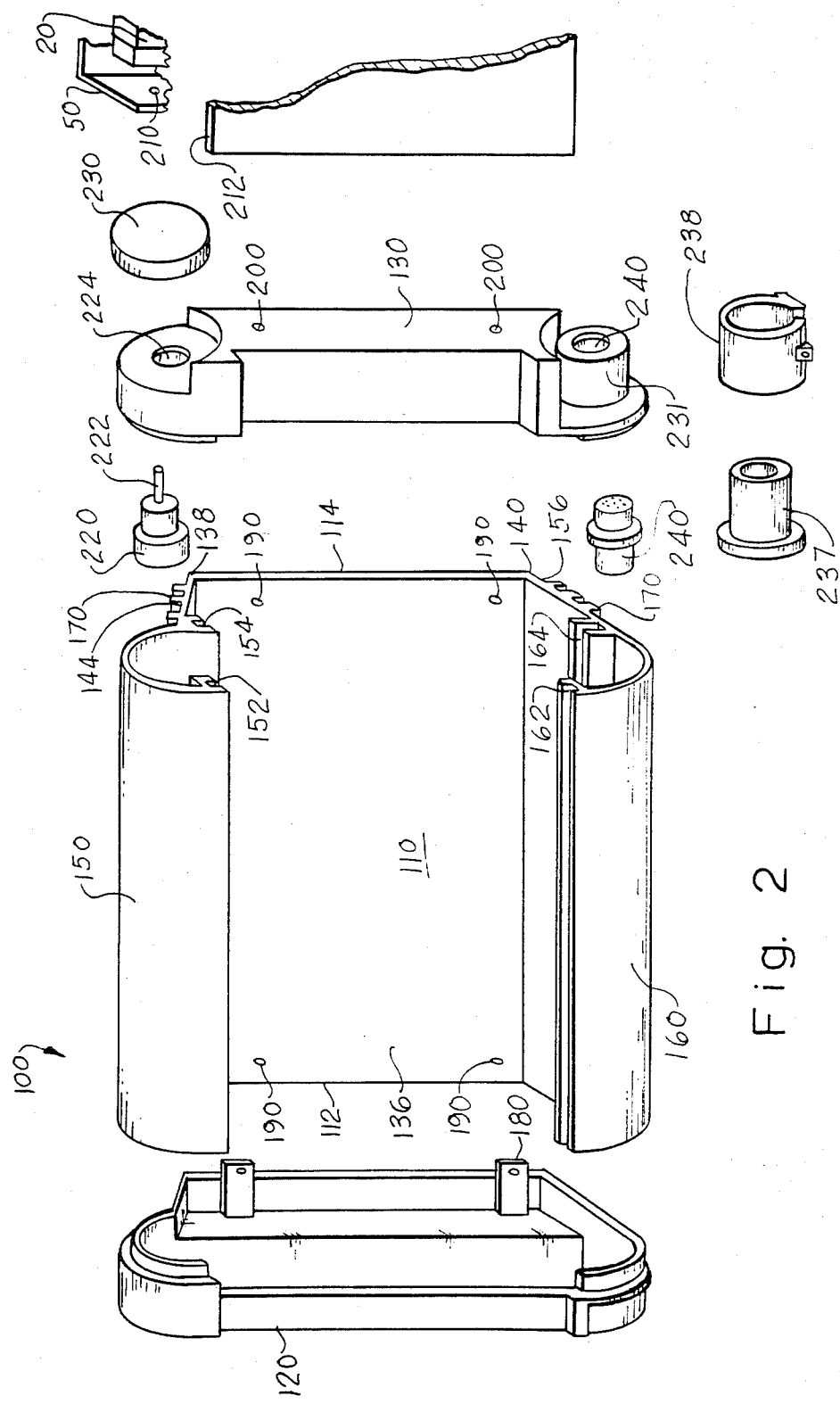
FIGS. 2 and 3 together are a perspective view of a portion of the housing for the display panel assembly of FIG. 1.
Figure 3:
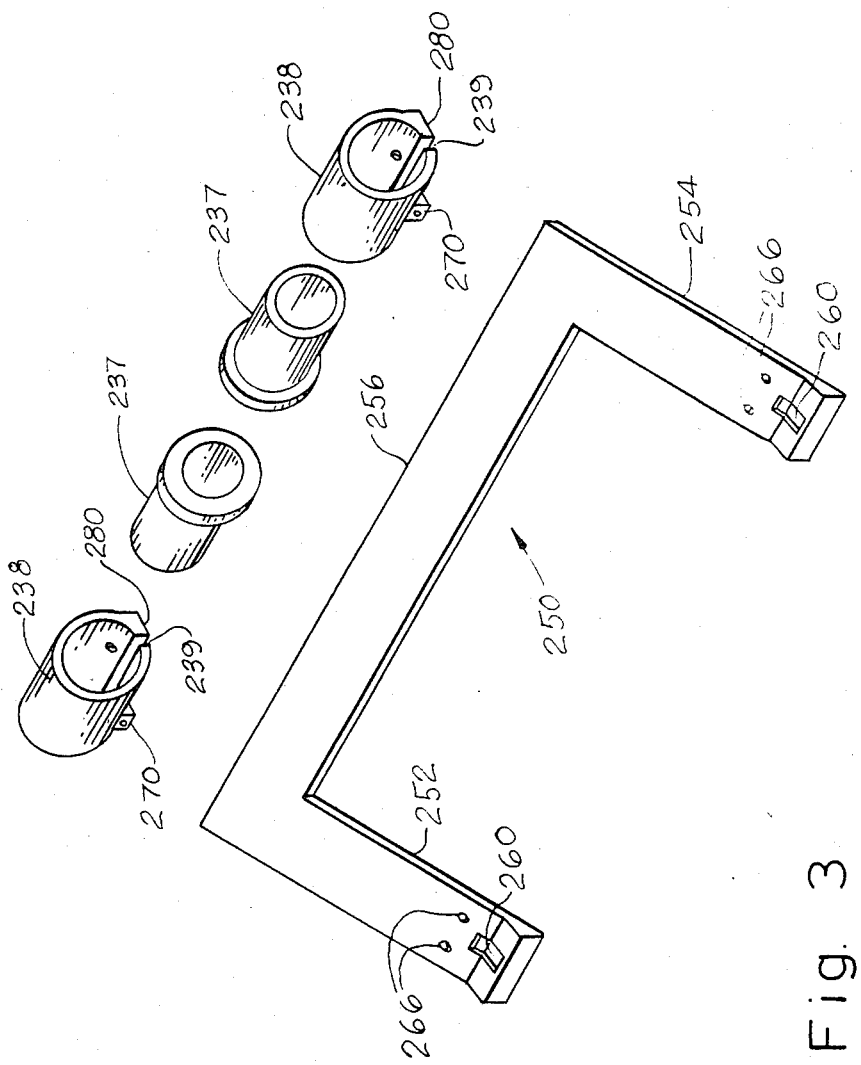

The terminal includes a housing 100 (FIGS. 2 and 3) for the panel assembly described above and comprising a central panel-housing portion 110 having a left end 112 and a right end 114 and left and right end caps 120 and 130 which are adapted to be inserted into the ends 112 and 114 of portion 110 and to be secured to the portion 110 in a manner to be described. These parts may be of extruded aluminum. The panel-housing portion 110 includes a large-area central portion 136 having an upper edge 138 and a lower edge 140. A wall 144 extends forwardly from the upper edge 138 and leads to a U-shaped tubular upper member 150. Similarly, a wall 156 extends forwardly from the lower edge 140 and leads to a U-shaped tubular lower member 160. The walss 144 and 156 are apertured to provide ventilation, and their outer surfaces carry horizontal ribs 170 which serve both decorative and cooling functions. The tubular member 150 includes two spaced-apart slots 152 and 154, inner slot 154 at its inner edge, and outer slot 152 at its outer edge. Slots 152 and 154 extend along the length of member 150. The lower tubular member similarly includes an inner slot 164 and an outer slot 162 which extend along the length of the lower tubular member.

The two U-shaped members 150, 160 face each other to provide aligned recesses, and slots 152, 162 face each other, and slots 154 and 164 face each other to provide aligned recesses for a purpose to be described.

As noted, the end caps 120 and 130 are adapted to engage the ends of the central portion 110 of the bousing, being shaped to mate with the left and right ends of the portion 110 of the housing and to form a tight mechanical fit therewith. The end caps include inwardly projecting tabs 180 which overlie holes 190 in the central portion 110 so that screws can be inserted to secure the parts together.

In addition, when the panel assembly is coupled to the housing, the upper and lower portions 42 and 44 of the frame are seated in the aligned slots 154 and 164, and screws are inserted in holes 200 in the end walls of the end caps and into holes 210 in the end walls 50 and 60 of the frame to secure the panel assembly and housing together. A filter plate 212 can be inserted in the aligned slots 152 and 162.

An on-off switch 220 is seated in the right hand end of the upper U-shaped member 150, and its operating shaft 222 extends through a hole 224 in the upper end of the end cap 130, and its operation knob 230 is attached to the outer end of the shaft. A keyboard connector socket 240 is inserted in the right hand end of the lower U-shaped member 160, and it projects into an access hole 244 in the lower portion of the end cap 130.

A U-shaped base 250 is provided for supporting the monitor 10, and the panel assembly described above is secured to the base as follows. The U-shaped base includes legs 252 and 254 and a connecting arm 256, and, at the free end of each arm, is a central slot 260 and at least two threaded holes 266.

Figure 4:
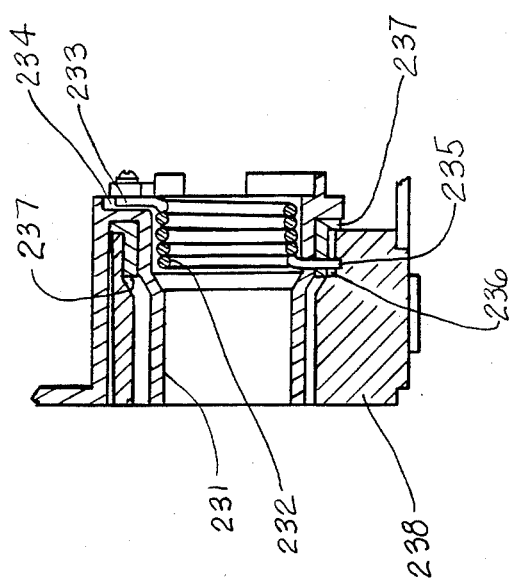
FIG. 4 is a sectional view of a portion of the apparatus of FIGS. 2 and 3 for controlling the tilt of the display panel of the terminal of the invention with respect to its base.

Each side bracket includes at its lower end (FIGS. 3 and 4) similar features (which carry the same reference numerals) for connecting it and the entire panel assembly to the base 250. These features include a horizontally projecting hollow, open-ended tube 231 in which a helical spring 232 is seated. One end 233 of the spring is seated in slot 234 in the end wall of the tube 231, and the other end 235 of the spring projects through an opening 236 in the wall of the tube 231. A bushing or sleeve 237 is threaded on the tube 231 and encloses the tube, and a bracket 238 is slipped over the tube in a tight mechanical fit. The frictional fit of the bracket 238 with sleeve 237 can be adjusted by opening or closing the bracket by means of a screw inserted in the tab 270 and used to pull the two part of the tab together and narrow space 239. The end 235 of the spring also enters a slot 244 in the bracket 238 and engages the bracket.

The bracket 238 is seated on the end of the leg 252 or 254 of the U-shaped base 250 with a projecting tab 270 on the bracket seated in the slot 260 and a flat portion 280 of the outer surface of the bracket resting on the leg and secured thereto by means of bolts inserted in the apertures 266 and into holes in the bracket.

With all of the parts of the panel assembly connected together, including frame 110, end caps 120 and 130, and with the frame carrying brackets 238 secured to the U-shaped frame 250, the panel assembly can be pivoted to any desired angle with respect to the base 250, and it is held at the desired angle by means of the spring 232.

A keyboard connector 240 is inserted in one of the tubes 231, and the appropriate connections are made therefrom to the keyboard to be used with the panel display. Connections are also made to the panel electronics by cables which enter right hand end cap 130 similar to keyboard connector 240 on left hand end cap 120.

The on-off switch 220 may be omitted, if desired, from terminal 10, with power being applied when the terminal main power cable (not shown) is connected to a power source.

Figure 5:
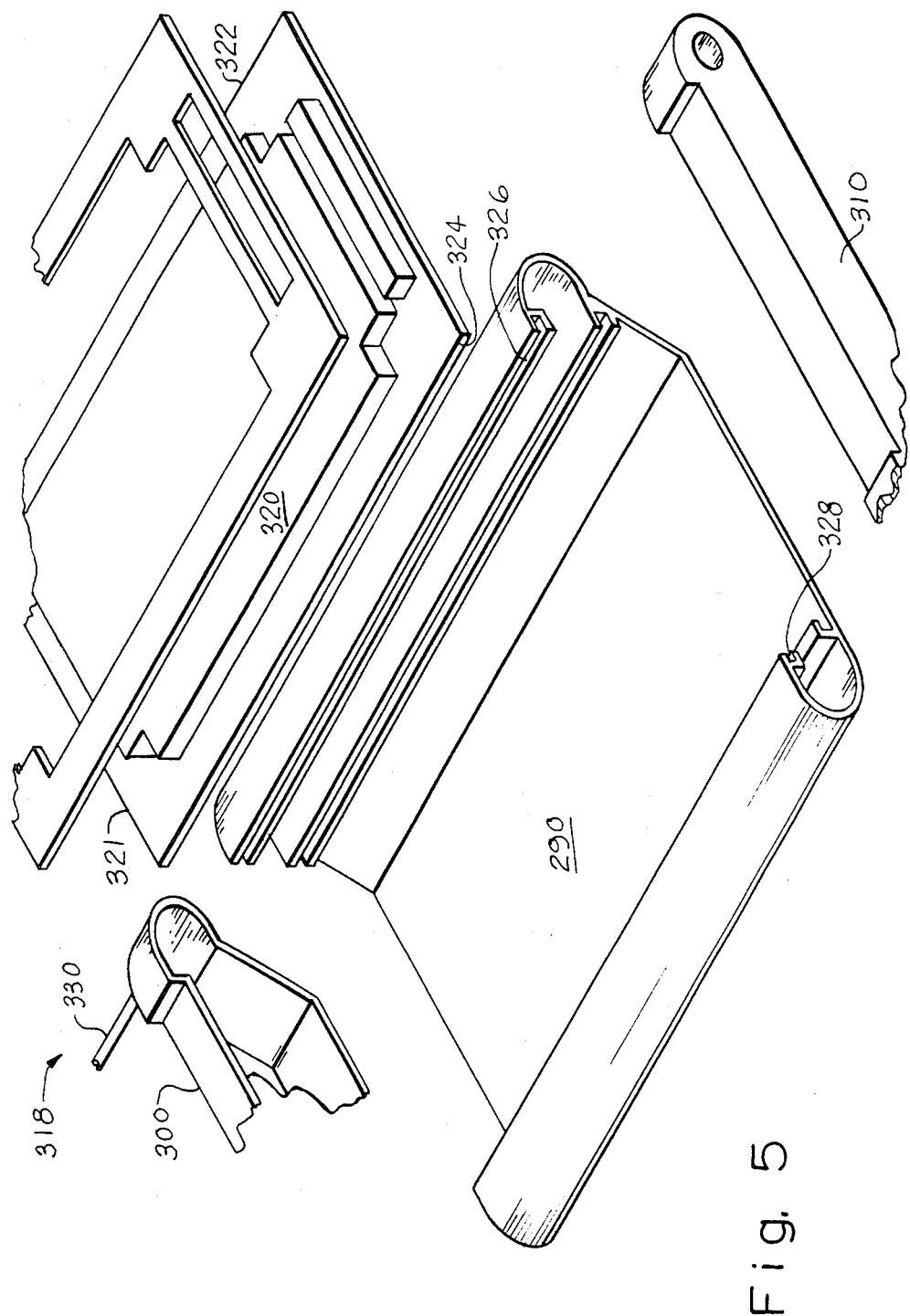
FIG. 5 is a perpective exploded view of the keyboard assembly of the terminal of the invention.
Figure 6:
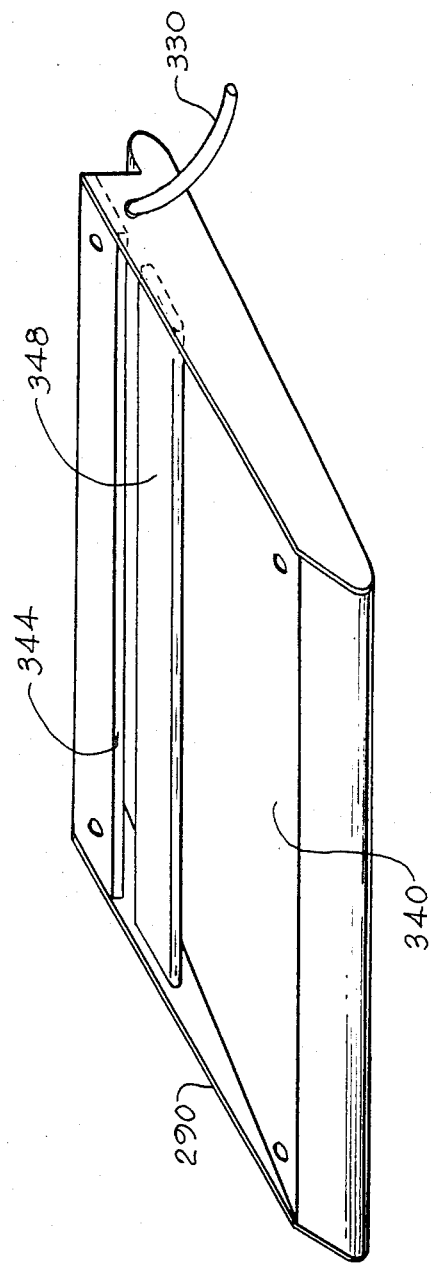
FIG. 6 is a perspective view of the bottom surface of the keyboard assembly.
Figure 7:
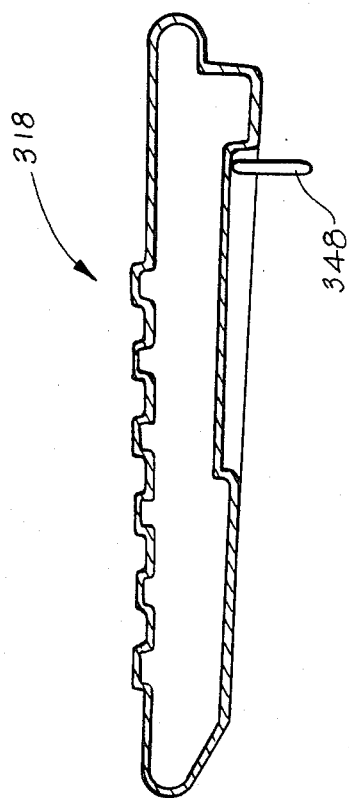
FIG. 7 is a side elevational view of the keyboard assembly shown in an elevated position.

The keyboard assembly 318 for the terminal 10 (FIGS. 5, 6, and 7) is mounted in an assembly similar to that for the display panel including a large-area central frame portion 290 having end caps 300 and 310. In a typical assembly, the keyboard 320 is mounted on a printed circuit board 321 carrying the required keyboard circuitry, and the board is coupled to the frame 290 with its upper and lower margins 322 and 324 in aligned slots 326 and 328 in the frame. The keyboard circuit is coupled to the panel assembly by means of a cable 330 extending out of end cap 300. A frame or fascia 334 may also be provided, if desired.

The keyboard assembly is provided with means for elevating its rear portion on a table for the convenience of the operator. For this purpose, the bottom surface 340 of the frame portion 290 slopes downwardly from front to rear to provide a depression toward the rear of the bottom surface. A wall 344 extends across the rear of the depression, and an elongated plate 348 is positioned in this depression at the rear of the bottom surface and is pivotably coupled to the side walls of the frame portion 290. The plate 348 is thin enough to fit flat in the depression.

What is claimed is:

1. A data display terminal comprising a generally thin, flat display panel assembly;
    a base to which said dispaly panel assembly is pivotably coupled; and
    means for coupling together said display panel assembly and said base, said coupling means including a hollow tubular member connected to said display panel assembly, a torsion spring disposed within said hollow tubular member, a frictional sleeve enclosing said hollow tubular member, and a split tubular bracket enclosing said sleeve and said hollow tubular member, said split tubular bracket being connected to said base;
    said display panel assembly including a central frame portion and left nd right end brackets secured thereto and flat display panel seated on said central frame portion.

2. The terminal defined in claim 1 wherein said hollow tubular member is part of said display panel assembly and said split tubular bracket is part of said base.

3. The terminal according to claim 1 including means for adjusting the frictional fit between said split tubular bracket and said sleeve.

4. The terminal in accordance with claim 3 wherein a first end of said torsion spring is engaged with said hollow tubular member and a second end of said torsion spring is engaged with said split tubular bracket.

5. The terminal in accordance with claim 4 wherein the first and second ends of said torsion spring are further engaged with corresponding first and second ends of said frictional sleeve.

6. The terminal in accordance with claim 3 wherein said frictional fit adjusting means includes:
    a tab connected to said split tubular bracket;
    a screw passing through a hole in said tab and engaging a threaded hole in said split tubular bracket, said tab connected to said split tubular bracket at a position whereby the adjustment of said screw opens and closes a longitudinal space between the end of said split tubular bracket.

7. The terminal in accordance with claim 1 wherein said coupling means is connected between said base and display panel assembly proximate respective first ends of said base and said display panel assembly and wherein said terminal further includes a second coupling means for further coupling together said display panel assembly and said base, said second coupling means being connected between said base and said assemly proximate respective second ends of said base and said assembly.

8. The apparatus in accordance with claim 1 wherein said hollow tubular member projects laterally from said display panel assembly.

9. A data display terminal comprising a generally thin, flat display panel assembly;
    a base to which said display panel assembly is pivotably coupled; said display panel assembly including
    a frame having parallel upper and lower edges,
    a flat display panel secured to said frame,
    a plurality of printed circuit boards secured between said panel and said frame,
    a housing having upper and lower slots extending along its length and having left and right edges,
    said frame carrying said panel and said boards being secured to said housing with its upper and lower edges seated in said upper and lower slots, respectively,
    left and right end caps secured to the left and right edges of said housing;
    said left and right end caps having left and right hollow tubular members at their respective lower ends, and
    means for coupling together said display panel assembly and said base, said coupling means including left and right torsion springs disposed within said left and right hollow tubular members respectively, left and right frictional sleeves enclosing said left and right hollow tubular members respectively, left and right split tubular brackets enclosing said left and right sleeves and said left and right hollow tubular members respectively, said left and right split tubular brackets being connected to said base.

10. The terminal defined in claim 9 wherein said left torsion spring is secured between said left hollow tubular member and said left split tubular bracket; said right torsion spring is secured between said right hollow tubular member and said right split tubular bracket.

11. The terminal defined in claim 10 wherein said left and right hollow tubular members are part of said left and right end caps respectively; said left and right split tubular brackets are part of said base.

12. The terminal according to claim 9 further including left and right adjusting means for adusting the frictional fit between said left and right split tubular brackets respectively and said left and right sleeves respectively.

13. The terminal according to claim 12 wherein:
a first end of said left torsion spring is engaged with said left hollow tubular member and a second end of said left torsion spring is engaged with said left split tubular bracket; and
a first end of said right torsion spring is engaged with said right hollow tubular member and a second end of said right torsion spring is engaged with said right split tubular bracket.

14. The terminal according to claim 13 wherein:
the first and second ends of said left torsion spring are further engaged with corresponding first and second ends of said left frictional sleeve; and
the first and second ends of said right torsion spring are further engaged with corresponding first and second ends of said right frictional sleeve.

15. The terminal according to claim 12 wherein said left frictional fit adjusting means includes:
a tab connected to said left split tubular bracket;
a screw passing through a hole in said tab and engaging a threaded hole in said left split tubular bracket, said tab connected to said left split tubular bracket at a position whereby the adjustment of said screw opens and closes a longitudinal space between the ends of said left split tubular bracket.

16. The terminal according to claim 9 wherein said left and right hollow tubular members project laterally from said display panel assembly.

* * * * *